(12) United States Patent
Li (10) Patent No.: US 9,170,640 B2
(45) Date of Patent: Oct. 27, 2015

(54) SYSTEM AND METHOD FOR TURNING OFF UNUSED COMPONENTS IN A PLURALITY OF LIMITED OPERATION MODES, USERS HAVE DIFFERENT TERMINAL USAGE RIGHTS FOR EACH (75) Inventor: Xiaolong Li, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 236 days.

(21) Appl. No.: 13/807,383

(22) PCT Filed: Jun. 29, 2011

(86) PCT No.: PCT/CN2011/076577
§ 371 (c)(1),
(2), (4) Date: Dec. 28, 2012

(87) PCT Pub. No.: WO2012/003775
PCT Pub. Date: Jan. 12, 2012

(65) Prior Publication Data
US 2013/0173945 A1    Jul. 4, 2013

(30) Foreign Application Priority Data
Jul. 9, 2010    (CN) .......................... 2010 1 0229205

(51) Int. Cl.
*G06F 1/00*    (2006.01)
*G06F 1/26*    (2006.01)
*G06F 1/32*    (2006.01)

(52) U.S. Cl.
CPC ............ *G06F 1/3287* (2013.01); *G06F 1/3203* (2013.01); *Y02B 60/1282* (2013.01)

(58) Field of Classification Search
CPC ... G06F 1/3256; G06F 1/3268; G06F 1/3278; G06F 1/3287
USPC ........................................ 713/300, 320, 324
See application file for complete search history.

(56) References Cited

U.S. PATENT DOCUMENTS 7,689,842 B2 *    3/2010    Anderson et al. ............. 713/324
8,156,361 B2 *    4/2012    Chin ............................. 713/324
(Continued)

FOREIGN PATENT DOCUMENTS

CN    101526845 A    9/2009
CN    101655734 A    2/2010
(Continued)

OTHER PUBLICATIONS

Patent Cooperation Treaty International Search Report in International application No. PCT/CN2011/076577 dated Sep. 23, 2011.

*Primary Examiner* — Mark Connolly
(74) *Attorney, Agent, or Firm* — Kinney & Lange, P.A.

(57) ABSTRACT

A control method, a control apparatus and a terminal are provided according to embodiments of the present invention. The method includes: receiving a trigger event; determining from the trigger event whether the terminal enters a limited operation mode in which at least one component of the terminal is unusable; generating a first control instruction when it is determined that the terminal enters the limited operation mode; and controlling to turn off power supply to the at least one component terminal according to the first control instruction. With the present invention, it is possible to switch the terminal system between a limited operation mode and a normal operation mode in terms of hardware, thereby saving power and satisfying the low-carbon environmental preservation requirements.

19 Claims, 4 Drawing Sheets (56) References Cited

U.S. PATENT DOCUMENTS

| | | | | |
|---|---|---|---|---|
| 8,245,066 B1* | 8/2012 | Sharkey | ............ | 713/324 |
| 8,402,289 B2* | 3/2013 | Maciocco et al. | ............ | 713/300 |
| 8,560,870 B2* | 10/2013 | Mizuura | ............ | 713/320 |
| 2010/0007646 A1* | 1/2010 | Tsuei et al. | ............ | 345/212 |
| 2012/0017101 A1* | 1/2012 | So et al. | ............ | 713/300 |

FOREIGN PATENT DOCUMENTS

| | | |
|---|---|---|
| CN | 101770272 A | 7/2010 |
| WO | 2008102492 A1 | 8/2008 |

* cited by examiner

SYSTEM AND METHOD FOR TURNING OFF UNUSED COMPONENTS IN A PLURALITY OF LIMITED OPERATION MODES, USERS HAVE DIFFERENT TERMINAL USAGE RIGHTS FOR EACH

The present invention generally relates to processing in a terminal, and more particularly, to a control method, a control apparatus and a terminal.

BACKGROUND

Currently, after a conventional terminal, such as a computer system, is started, almost all of its functions are made usable, including networking, video playing, and plugging and pulling a Universal Serial Bus (USB) device at any time. However, in some cases, while a computer is used, not all the functions of the computer system are necessary. For example, in a case where the computer is used as a teaching-purpose computer or a student-used computer, a teacher may ask students to simply perform a particular operation or accomplish a particular task on a local hard disk. In this case, it is desirable to disable some of the functions of the computer system, for example, to prevent the students from using the computer to browse web pages, chat, watch movies or copying their software and games to the computer via a card reader to perform other operations, such that the students will not be distracted from their task.

In the prior art, some functions can be disabled using some software. For example, in a net bar, a user may be prohibited from using some functions of a computer, e.g., from using a disc drive. However, this solution is software based. Although it appears that the user cannot use the disabled functions, the devices that actually implement these functions (such as the disc drive) are not powered off, i.e., they are still connected with the main board of the computer and their power supplies are not cut off. Thus, there is a waste of energy, which does not comply with the recent low-carbon environmental preservation requirements.

SUMMARY

A control method, a control apparatus and a terminal are provided according to embodiments of the present invention, which are capable of automatically determining an operation mode of a terminal and switching the terminal system between a limited operation mode and a normal operation mode in terms of hardware, thereby saving power and satisfying the low-carbon environmental preservation requirements.

According to an embodiment of the present invention, a control method in a terminal comprising one or more component, the control method includes: receiving a trigger event; determining from the trigger event whether the terminal enters a limited operation mode in which at least one of the one or more component is unusable; generating a first control instruction when it is determined that the terminal enters the limited operation mode; and controlling to turn off power supply to the at least one component according to the first control instruction.

Preferably, controlling to turn off power supply to the at least one component according to the first control instruction includes: transmitting the first control instruction to a Basic Input Output System (BIOS), and controlling, by the BIOS, to turn off the power supply to the at least one component according to the first control instruction.

Preferably, controlling, by the BIOS, to turn off the power supply to the at least one component according to the first control instruction includes: controlling, by the BIOS, a General Purpose Input Output (GPIO) according to the first control instruction such that the GPIO functions as an on/off control signal to turn off the power supply to the at least one component.

Preferably, the GPIO functioning as an on/off control signal to turn off the power supply to the at least one component includes: controlling, by the BIOS, a GPIO at a south bridge/embedded controller according to the first control instruction such that the GPIO functions as an on/off control signal to turn off the power supply to a Universal Serial Bus (USB) port and/or a network control chip.

Preferably, controlling, by the BIOS, to turn off the power supply to the at least one component according to the first control instruction further includes: transmitting, by the BIOS, a second control instruction to a power source according to the first control instruction, and turning off, by a micro control unit in the power source, the power supply to the at least one component using a control signal.

Preferably, transmitting, by the BIOS, a second control instruction to a power source according to the first control instruction, and turning off, by a micro control unit in the power source, the power supply to the at least one component using a control signal includes: transmitting, by the BIOS, the second control instruction to the power source according to the first control instruction, and turning off, by the micro control unit in the power source, the power supply to a disc drive using a specific control signal.

Preferably, the control method further includes: generating a third control instruction when it is determined that the terminal does not enter the limited operation mode; and controlling to turn on power supply to the at least one component according to the third control instruction.

Preferably, controlling to turn on the power supply to the at least one component according to the third control instruction includes: transmitting the third control instruction to the BIOS, and controlling, by the BIOS, to turn on the power supply to the at least one component according to the third control instruction.

According to another embodiment of the present invention, a control apparatus in a terminal comprising one or more component, the control apparatus includes: a receiving unit configured to receive a trigger event; a determining unit configured to determine from the trigger event whether the terminal enters a limited operation mode in which at least one of the one or more component is unusable; a first processing unit configured to generate a first control instruction when the determining unit determines that the terminal enters the limited operation mode, so as to control to turn off power supply to the at least one component according to the first control instruction.

According to another embodiment of the present invention, a terminal includes: one or more component; a receiving unit configured to receive a trigger event; a determining unit configured to determine from the trigger event whether the terminal enters a limited operation mode in which at least one of the one or more component is unusable; and a first processing unit configured to generate a first control instruction when the determining unit determines that the terminal enters the limited operation mode, so as to control to turn off power supply to the at least one component according to the first control instruction.

Preferably, the terminal further includes a Basic Input Output System (BIOS). The first processing unit is configured to transmit the first control instruction to the BIOS, and the BIOS controls to turn off the power supply to the at least one component according to the first control instruction.

Preferably, the first processing unit is configured to transmit the first control instruction to the BIOS, and the BIOS controls a General Purpose Input Output (GPIO) according to the first control instruction such that the GPIO functions as an on/off control signal to turn off the power supply to the at least one component.

Preferably, the at least one component includes a Universal Serial Bus (USB) port and/or a network control chip, and the terminal further includes a south bridge/embedded controller. The first processing unit is configured to transmit the first control instruction to the BIOS, and the BIOS controls a GPIO at the south bridge/embedded controller according to the first control instruction such that the GPIO functions as an on/off control signal to turn off the power supply to the USB port and/or the network control chip.

Preferably, the first processing unit is configured to transmit the first control instruction to the BIOS, and the BIOS transmits a second control instruction to a power source according to the first control instruction such that a micro control unit in the power source turns off the power supply to the at least one component using a control signal.

Preferably, the at least one component includes a disc drive. The first processing unit is configured to transmit the first control instruction to the BIOS, and the BIOS transmits the second control instruction to the power source according to the first control instruction such that the micro control unit in the power source turns off the power supply to the disc drive using a specific control signal.

Preferably, the terminal further includes a second processing unit configured to generate a third control instruction when the determining unit determines that the terminal does not enter the limited operation mode, so as to control to turn on power supply to the at least one component according to the third control instruction.

The embodiments of the present invention can automatically determining an operation mode of a terminal and switching the terminal system between a limited operation mode and a normal operation mode in terms of hardware. In this way, when a particular function of the terminal system is not required, the component implementing the function can be powered off in hardware, thereby saving power and satisfying the low-carbon environmental preservation requirements.

BRIEF DESCRIPTION OF THE DRAWINGS

In order to clearly explain the solutions according to the embodiments of the present invention or the prior art, the figures used in the following descriptions of the embodiments or prior art will be briefly introduced. Apparently, the following figures only relates to some of the embodiments of the present invention. Those skilled in the art can derive further figures from the following figures without any due efforts.

DETAILED DESCRIPTION OF THE EMBODIMENTS

In the following, the embodiments of the present invention will be described clearly and thoroughly with reference to the figures. The embodiments described below are only a part, not all, of embodiments of the present invention. Those skilled in the art can derive further embodiments from the embodiments described herein without any due efforts, which are all encompassed by the scope of the present invention.

It is to be noted that, for the purpose of description of various embodiments of the present invention, a computer is used herein as an example of the terminal in the following embodiments. However, it can be appreciated by those skilled in the art that the terminal is not limited to a computer, but may include any other terminal device such as Personal Digital Assistant (PDA), netbook, and the like.

Figure 1:
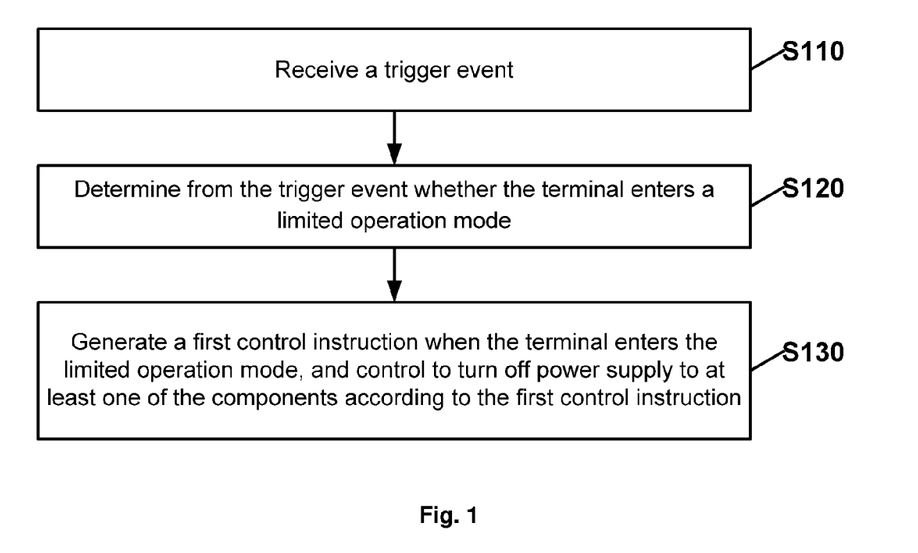
FIG. 1 is a schematic flowchart illustrating a first embodiment of the control method according to the present invention.
Figure 3:
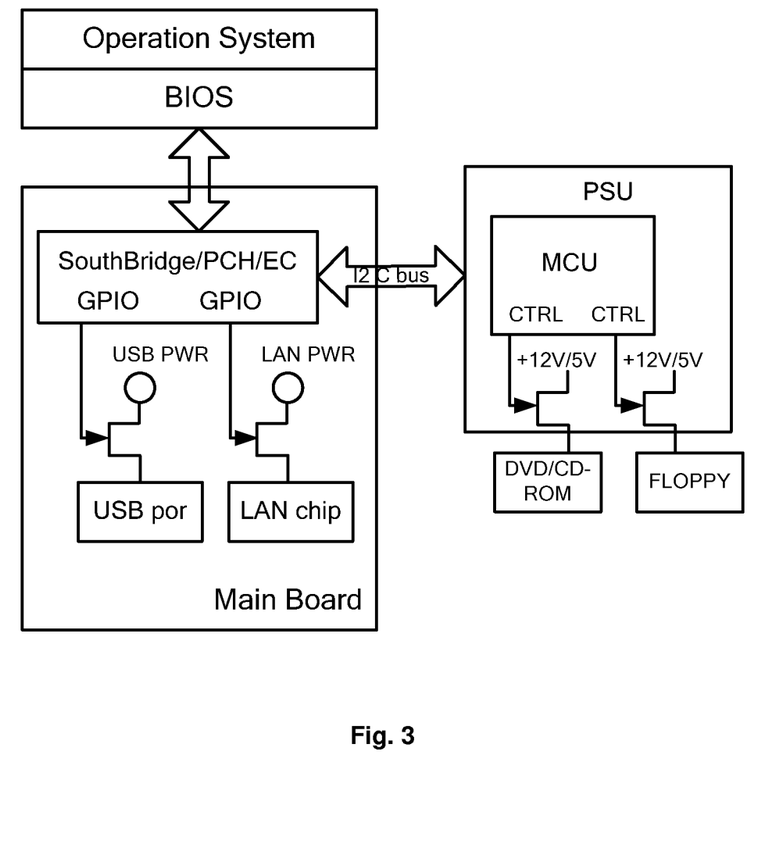
FIG. 3 is a schematic diagram showing a system architecture in which the present invention may be applied.

Reference is now made to FIG. 1 and FIG. 3. FIG. 1 is a schematic flowchart illustrating a first embodiment of the control method according to the present invention. FIG. 3 is a schematic diagram showing a system architecture in which the present invention is applicable. The system architecture shown in FIG. 3 is exemplary. It can be understood by those skilled in the art that the present invention is applicable in various existing or future terminals and system architectures having a limited operation mode and a normal operation mode.

The terminal, in which the control method of the present invention is applied, includes at least one component. In the embodiments described below, for the purpose of explanation, the expressions of "the terminal includes at least one component" and "the terminal includes a plurality of components" can be used exchangeable where appropriate. It can be understood by those skilled in the art that, in the embodiments described below, a terminal described as including a plurality of components may include one component. Here, a component refers to a constituent part of the terminal, such as a USB port, an audio output port, a wired/wireless network control chip, a disc drive, a floppy drive, a card reader, a hard drive, and the like.

Referring to FIG. 1, a control method of the present invention includes the following steps.

At step S110, a trigger event is received.

The trigger event can be an event indicating that a user wants to trigger an operation. For example, the trigger event may be that a user inputs an instruction or presses a button. Preferably, in the present invention, the trigger event is that a user enters a user password. The user password may include an administrator password and a non-administrator password, and may contain a user name and a password. The present invention is not limited to this, and the user password may take any other form.

The user password may be a login password by which the user logs in a system. That is, the login password of the user may be used to indicate a trigger event, and thus the login operation of the user and the trigger event may be linked together. The user password may be entered after a particular command is executed. For example, the user may be asked to enter the user password after a screen saver program or a standby program is executed. Alternatively, the user password may be entered at a particular timing required by the system. For example, the system may request the user to enter the user password on a regular basis, e.g., every two or five hours, for system security. The present invention is not limited to the above, and the trigger event may be initiated on any other occasion.

At step S120, it is determined from the trigger event whether the terminal enters a limited operation mode.

The limited operation mode refers to a mode in which at least one of a plurality of components of the terminal is unusable. As opposed to the limited operation mode, a normal operation mode refers to a mode in which all components of the terminal are usable to the user.

As an example, if the user enters the administrator password, the operation mode for the user may be determined as the normal operation mode. On the other hand, if the user enters the non-administrator password, the operation mode for the user may be determined as the limited operation mode. For any other trigger event, the operation mode for the user may also be determined from the characteristics of the other trigger event. The limited operation mode may be subdivided into different levels, such that use right management may be implemented for different combinations of components depending on different passwords. For example, a disc drive and a floppy drive may be turned off in response to a first password, and some other components may be turned off in response to a second password.

At step S130, a first control instruction is generated when it is determined that the terminal enters the limited operation mode, and the power supply to the at least one component is turned off according to the first control instruction.

In the following, the above control method will be further detailed with reference to the system architecture shown in FIG. 3. As shown in FIG. 3, the system architecture of the terminal includes a main board, an operating system, a Basic Input Output System (BIOS) and a host Power Source Unit (PSU). A south bridge/PCH (Platform Controller Hub, an integrated south bridge from Intel)/Embedded Controller (EC) is installed in the main board, in which a General Purpose Input Output (GPIO) may be used to control a power supply of a Universal Serial Bus (USB) port/network control chip (e.g., a Local Area Network (LAN) control chip) coupled thereto, USB PWR/LAN PWR. The main board is coupled to the host PSU via an I2C bus and thus can communicate with the host PSU via the I2C bus. The PSU includes a Micro Control Unit (MCU) which may control, with a control signal CTRL, the +12V/+5V voltages for a disc drive (Blue ray DVD/DVD/CD-ROM) and a floppy drive (Floppy), so as to turn on/off the power supply to the DVD/CD-ROM and the Floppy. The MCU in the PSU may also feed back control information of the power source to the South Bridge/PCH/EC on the main board via the I2C bus, such that the main board and the PSU may interact with each other.

The system architecture shown in FIG. 3 can further include input devices such as a button, a keyboard and a mouse, a processor such as a Central Processing Unit (CPU), and a memory. These devices, though not shown, are apparent to those skilled in the art. For example, the above control method may be performed using an input device and a processor, and may be applied to the system architecture shown in FIG. 3.

For example, at step S110, the user inputs an instruction via the input device and, accordingly, the terminal receives a corresponding trigger event.

At step S120, the processor determines from the trigger event whether the terminal enters the limited operation mode.

At step S130, when it is determined that the terminal enters the limited operation mode, the processor generates a first control instruction and sends it to the BIOS such that the BIOS controls to turn off the power supply to at least one of the components of the terminal according to the first control instruction.

In particular, in the step S130, the BIOS may control a General Purpose Input Output (GPIO) according to the first control instruction such that the GPIO functions as an on/off control signal to turn off the power supply to the component.

For example, the BIOS may control a specific GPIO at a south bridge/PCH (Platform Controller Hub, an integrated south bridge from Intel)/Embedded Controller (EC) according to the first control instruction such that the GPIO functions as an on/off control signal to turn off the power supply to a Universal Serial Bus (USB) port/network control chip (e.g., a Local Area Network (LAN) control chip), i.e., cuts off the power supply to the USB port/network control chip.

In particular, in the step S130, the BIOS may transmit a second control instruction to the host power source unit (PSU) according to the first control instruction such that a micro control unit (MCU) in the host power source unit turns off the power supply to the component using a specific control signal CTRL.

As an example, the BIOS may transmit a second control instruction to the host power source unit (PSU) according to the first control instruction such that the micro control unit (MCU) in the host power source unit turns off the power supply to the disc drive or the floppy drive using a specific control signal CTRL.

More specifically, the BIOS may transmit the second control instruction to the PSU via the I2C bus according to the first control instruction. Upon receiving the instruction, the MCU in the PSU controls the +12V/+5V voltages for the disc drive (Blue ray DVD/DVD/CD-ROM) or the floppy drive (Floppy) using the specific control signal CTRL, i.e., cuts off the power supply to the DVD/CD-ROM and the Floppy. Additionally, the MCU in the PSU may also feed back control information of the power source to the South Bridge/PCH/EC on the main board via the I2C bus, such that the main board and the PSU can interact with each other.

According to the present invention, if the power supply to the component has been turned off before the terminal enters the limited operation mode, the power supply to the component may simply remain off in the limited operation mode.

Figure 2:
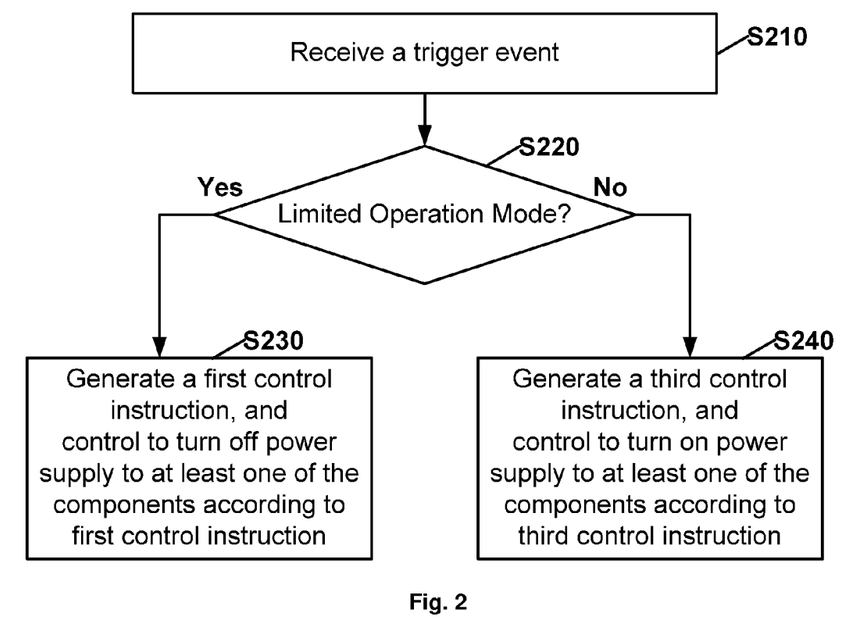
FIG. 2 is a schematic flowchart illustrating a second embodiment of the control method according to the present invention.

Reference is now made to FIG. 2, which is a schematic flowchart illustrating a second embodiment of the control method according to the present invention. The steps S210, S220 and S230 in the second embodiment shown in FIG. 2 are the same as the steps S110, S120 and S130 in the first embodiment shown in FIG. 1, and their detailed description will be omitted here. The second embodiment shown in FIG. 2 differs from the first embodiment in that, in step S220, the terminal does not enter the limited operation mode, and that an additional step S240 is included in which a third control instruction is generated for controlling to turn on power supply to at least one of the components according to the third control instruction.

Next, this embodiment will be described with reference to the system architecture of FIG. 3.

At step S210, a trigger event is received via e.g., the input device.

At step S220, the processor, for example, determines from the trigger event whether the terminal enters the limited operation mode.

At step S240, when it is determined that the terminal enters does not enter the limited operation mode (i.e., entering the normal operation mode), a third control instruction is generated for controlling to turn on power supply to at least one of the components according to the third control instruction.

For example, the third control instruction can be transmitted to the BIOS such that the BIOS controls to turn on the power supply to the at least one of the components of the terminal according to the third control instruction In this embodiment, the at least one of the components of the terminal to which the power supply is turned on may correspond to the component to which the power supply had been turned off in the limited operation mode. If the power supply to a component had not been turned off in the limited operation mode, the power supply to the component simply remains on.

More specifically, the BIOS controls a GPIO according to the third control instruction such that the GPIO functions as an on/off control signal to turn on the power supply to the component.

For example, the BIOS controls a specific GPIO at the south bridge/EC according to the third control instruction such that the GPIO functions as an on/off control signal to turn on the power supply to the USB port/network control chip (such as LAN control chip).

Alternatively, at step S240, the BIOS transmits a fourth instruction to the PSU according to the third control instruction such that the MCU in the PSU turns on the power supply to the component using a specific control signal CTRL.

For example, the BIOS transmits the fourth control signal to the PSU according to the third control instruction such that the MCU in the PSU turns on the power supply to the disc drive or the floppy drive using the specific control signal CTRL.

In this embodiment, after login, the computer can also be switched between the operations modes whether it is in the limited operation mode or the normal operation mode. In particular, when the computer is in the normal operation mode, the power supply to the network control chip, the USB, the DVD-ROM and the Floppy may be turned off by entering a specific password, and then the computer enters the limited operation mode. On the other hand, when the computer is in the limited operation mode, the power supply to the network control chip, the USB, the DVD-ROM and the Floppy may be turned on by entering a corresponding password, and then the computer enters the normal operation mode.

The embodiments of the present invention can automatically determining an operation mode of a terminal, and switching the terminal system between a limited operation mode and a normal operation mode in terms of hardware. In this way, when a particular function of the terminal system is not required, the component implementing the function can be powered off in hardware, thereby saving power and satisfying the low-carbon environmental preservation requirements, when compared with the prior art which limits the terminal function only in terms of software.

Figure 4:
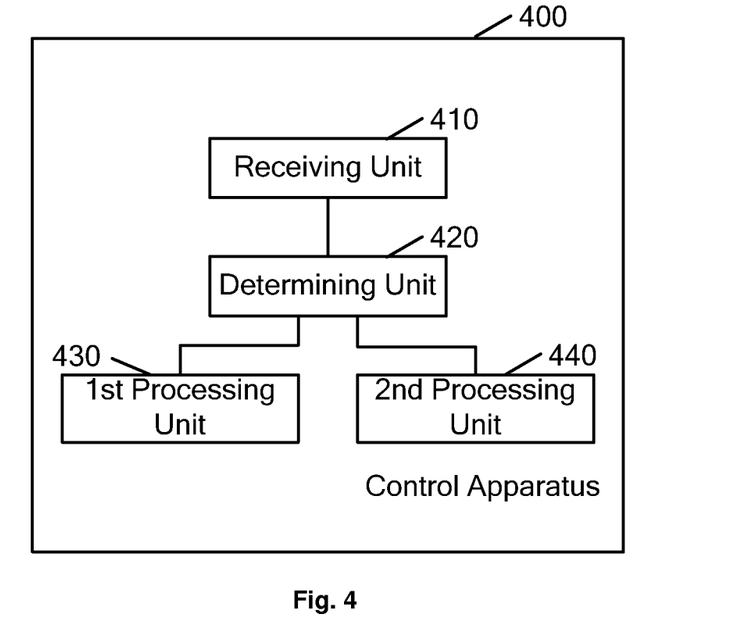
FIG. 4 is a schematic block diagram showing a first embodiment of the control apparatus according to the present invention.

FIG. 4 is a schematic block diagram showing an exemplary embodiment of the control apparatus according to the present invention. The control apparatus 400 is used in a terminal including a plurality of components, e.g., a terminal having the system architecture shown in FIG. 3.

As shown in FIG. 4, the control apparatus 400 includes a receiving unit 410 configured to receive a trigger event. For example, the receiving unit 410 can be implemented by an input device of the terminal.

The trigger event can be an event indicating that a user wants to trigger an operation. For example, the trigger event may be that a user inputs an instruction or presses a button. Preferably, in the present invention, the trigger event is that a user enters a user password. The user password may include an administrator password and a non-administrator password, and may contain a user name and a password.

The control apparatus 400 also includes a determining unit 420 configured to determine from the trigger event whether the terminal enters a limited operation mode in which at least one of the components of the terminal is unusable. The determining unit 420 may be implemented by a processor of the terminal.

The control apparatus 400 further includes a first processing unit 430 configured to generate a first control instruction when the determining unit determines that the terminal enters the limited operation mode, so as to control to turn off power supply to the at least one component of the terminal. The first processing unit 430 may also be implemented by as the processor of the terminal.

Preferably, the control apparatus 400 further includes a second processing unit 400 configured to generate a third control instruction when the determining unit determines that the terminal does not enter the limited operation mode so as to control to turn on power supply to the at least one component. The second processing unit 440 can also be implemented by the processor of the terminal.

It is to be noted that the embodiments of the control apparatus correspond to the embodiments of the control method according to the present invention. The operation processes and principles of the respective components of the control apparatus have been described in detail in connection with the embodiments of the control method. Thus, the details of the control method also apply to the embodiments of the control apparatus.

According to an embodiment of the present invention, a terminal is disclosed, which is for example a terminal having the above control apparatus 400.

The terminal can include:

at least one component;

a receiving unit configured to receive a trigger event;

a determining unit configured to determine from the trigger event whether the terminal enters a limited operation mode in which the at least one component is unusable;

a first processing unit configured to generate a first control instruction when the determining unit determines that the terminal enters the limited operation mode so as to control to turn off power supply to the at least one component according to the first control instruction.

Preferably, the terminal further includes a Basic Input Output System (BIOS). The first processing unit is configured to transmit the first control instruction to the BIOS such that the BIOS controls to turn off the power supply to the at least one component according to the first control instruction.

For example, the first processing unit is configured to transmit the first control instruction to the BIOS, and the BIOS controls a General Purpose Input Output (GPIO) according to the first control instruction, such that the GPIO functions as an on/off control signal to turn off the power supply to the at least one component.

In another embodiment, the at least one component may be a Universal Serial Bus (USB) port and/or a network control chip and the terminal further comprises a south bridge/embedded controller. The first processing unit is configured to transmit the first control instruction to the BIOS, and the BIOS controls a GPIO at the south bridge/embedded controller according to the first control instruction, such that the GPIO functions as an on/off control signal to turn off the power supply to the USB port and/or the network control chip.

Alternatively, the first processing unit is configured to transmit the first control instruction to the BIOS, and the BIOS transmits a second control instruction to a power source according to the first control instruction to control a micro control unit in the power source to turn off the power supply to the at least one component using a control signal.

In another embodiment, the at least one component may be a disc drive or a floppy drive, the first processing unit is configured to transmit the first control instruction to the BIOS such that the BIOS transmits the second control instruction to the power source according to the first control instruction to control the micro control unit in the power source to turn off the power supply to the disc drive using a specific control signal.

According to another embodiment, the terminal further includes a second processing unit configured to generate a third control instruction when the determining unit determines that the terminal does not enter the limited operation mode so as to control to turn on power supply to the at least one component according to the third control instruction.

It is to be noted that the embodiments of the terminal correspond to the embodiments of the control method according to the present invention. The operation processes and principles of the respective components of the terminal have been described in detail in connection with the embodiments of the control method. Thus, the details of the control method also apply to the embodiments of the terminal.

It will be appreciated by those skilled in the art that all or part of the steps of the method according to the above embodiments can be implemented by hardware executing instructions of a program. The program can be stored in a computer accessible storage medium and when executed, performs the steps of the above method embodiments. The storage medium can be for example a magnetic disk, a optical disc, a Read-Only Memory (ROM) or a Random Access Memory (RAM). In the methods according to the various embodiments of the present invention, the sequence numbers of the steps does not limit the order of the respective steps. Those skilled in the art can contemplate that the order of the steps may vary without any inventive efforts. Such variation is encompassed by the scope of the present invention.

The preferred embodiments of the present invention have been described above. However, the present invention is not limited to these embodiments. Any modifications, alternatives and improvements made within the spirit and scope of the present invention are all encompassed by the scope of the present invention.

What is claimed is:

1. A control method in a terminal comprising one or more components, the control method comprising:
   receiving a trigger event;
   determining whether the terminal enters a limited operation mode in which at least one of the one or more components is unusable;
   generating a first control instruction when it is determined that the terminal enters the limited operation mode; and
   controlling to turn off power supply to the at least one component according to the first control instruction;
   wherein the limited operation mode is one of a plurality of different limited operation modes corresponding to different trigger events, and different subsets of the one or more components are unusable in the different limited operation modes, respectively, so that one or more users can have different rights to use the terminal by initiating the different trigger events.

2. The control method of claim 1, wherein controlling to turn off power supply to the at least one component according to the first control instruction comprises:
   transmitting the first control instruction to a Basic Input Output System (BIOS), and controlling, by the BIOS, to turn off the power supply to the at least one component according to the first control instruction.

3. The control method of claim 2, wherein controlling, by the BIOS, to turn off the power supply to the at least one component according to the first control instruction comprises:
   controlling, by the BIOS, a General Purpose Input Output (GPIO) port according to the first control instruction such that a signal from the GPIO port functions as an on/off control signal to turn off the power supply to the at least one component.

4. The control method of claim 3, wherein the GPIO port functioning as an on/off control signal to turn off the power supply to the at least one component comprises:
   controlling, by the BIOS, a GPIO port at a south bridge/embedded controller according to the first control instruction such that a signal from the GPIO port functions as an on/off control signal to turn off the power supply to a Universal Serial Bus (USB) port and/or a network control chip.

5. The control method of claim 2, wherein controlling, by the BIOS, to turn off the power supply to the at least one component according to the first control instruction further comprises:
   transmitting, by the BIOS, a second control instruction to a power source according to the first control instruction, and turning off, by a micro control unit in the power source, the power supply to the at least one component using a control signal.

6. The control method of claim 5, wherein transmitting, by the BIOS, a second control instruction to a power source according to the first control instruction, and turning off, by a micro control unit in the power source, the power supply to the at least one component using a control signal comprises:
   transmitting, by the BIOS, the second control instruction to the power source according to the first control instruction, and turning off, by the micro control unit in the power source, the power supply to a disc drive using a specific control signal.

7. The control method of claim 1, further comprising:
   generating a third control instruction when it is determined that the terminal does not enter the limited operation mode; and
   controlling to turn on power supply to the at least one component according to the third control instruction.

8. The control method of claim 7, wherein controlling to turn on the power supply to the at least one component according to the third control instruction comprises:
   transmitting the third control instruction to the BIOS, and controlling, by the BIOS, to turn on the power supply to the at least one component according to the third control instruction.

9. The control method of claim 1, wherein the trigger event comprises a user password input upon login operation.

10. A control apparatus in a terminal comprising one or more component, the control apparatus comprising:
    a receiving unit configured to receive a trigger event;
    a determining unit configured to determine whether the terminal enters a limited operation mode corresponding to the trigger event in which at least one of the one or more components is unusable;
    a first processing unit configured to generate a first control instruction when the determining unit determines that the terminal enters the limited operation mode, so as to control to turn off power supply to the at least one component according to the first control instruction;
    wherein the limited operation mode is one of a plurality of different limited operation modes corresponding to different trigger events, and different subsets of the one or more components are unusable in the different limited operation modes, respectively, so that one or more users can have different rights to use the terminal by initiating the different trigger events.

11. The control apparatus of claim 10, wherein the trigger event comprises a user password input upon login operation.

12. A terminal comprising:
one or more component;
a receiving unit configured to receive a trigger event;
a determining unit configured to determine whether the terminal enters a limited operation mode corresponding to the trigger event in which at least one of the one or more components is unusable;
a first processing unit configured to generate a first control instruction when the determining unit determines that the terminal enters the limited operation mode, so as to control to turn off power supply to the at least one component according to the first control instruction;
wherein the limited operation mode is one of a plurality of different limited operation modes corresponding to different trigger events, and different subsets of the one or more components are unusable in the different limited operation modes, respectively, so that one or more users can have different rights to use the terminal by initiating the different trigger events.

13. The terminal of claim 12, further comprising:
a Basic Input Output System (BIOS);
wherein the first processing unit is configured to transmit the first control instruction to the BIOS, and the BIOS controls to turn off the power supply to the at least one component according to the first control instruction.

14. The terminal of claim 13, wherein the first processing unit is configured to transmit the first control instruction to the BIOS, and the BIOS controls a General Purpose Input Output (GPIO) port according to the first control instruction such that a signal from the GPIO port functions as an on/off control signal to turn off the power supply to the at least one component.

15. The terminal of claim 14, wherein the at least one component comprises a Universal Serial Bus (USB) port and/or a network control chip, and the terminal further comprises a south bridge/embedded controller;
wherein the first processing unit is configured to transmit the first control instruction to the BIOS, and the BIOS controls a GPIO port at the south bridge/embedded controller according to the first control instruction such that a signal from the GPIO port functions as an on/off control signal to turn off the power supply to the USB port and/or the network control chip.

16. The terminal of claim 13, wherein the first processing unit is configured to transmit the first control instruction to the BIOS, and the BIOS transmits a second control instruction to a power source according to the first control instruction such that a micro control unit in the power source turns off the power supply to the at least one component using a control signal.

17. The terminal of claim 16, wherein the at least one component comprises a disc drive, and wherein the first processing unit is configured to transmit the first control instruction to the BIOS, and the BIOS transmits the second control instruction to the power source according to the first control instruction such that the micro control unit in the power source turns off the power supply to the disc drive using a specific control signal.

18. The terminal of claim 12, further comprising:
a second processing unit configured to generate a third control instruction when the determining unit determines that the terminal does not enter the limited operation mode, so as to control to turn on power supply to the at least one component according to the third control instruction.

19. The terminal of claim 12, wherein the trigger event comprises a user password input upon login operation.

* * * * *